(12) United States Patent
Shabtay et al.

(10) Patent No.: US 7,119,941 B1
(45) Date of Patent: Oct. 10, 2006

(54) INPUT OUTPUT MATCHING IN OPTICAL PROCESSING

(75) Inventors: Gal Shabtay, Petach-Tikva (IL); David Mendlovic, Petach-Tikva (IL); Aviram Sariel, Ramot-Hashavim (IL)

(73) Assignee: Lenslet Ltd., Ramat-Gan (IL)

( * ) Notice: Subject to any disclaimer, the term of this patent is extended or adjusted under 35 U.S.C. 154(b) by 0 days.

(21) Appl. No.: 09/979,178

(22) PCT Filed: May 19, 2000

(86) PCT No.: PCT/IL00/00282

§ 371 (c)(1),
(2), (4) Date: Feb. 21, 2002

(87) PCT Pub. No.: WO00/72105

PCT Pub. Date: Nov. 30, 2000

Related U.S. Application Data (63) Continuation-in-part of application No. PCT/IL99/00479, filed on Sep. 5, 1999.

(30) Foreign Application Priority Data

May 19, 1999 (IL) .................................... 130038
Jul. 25, 1999 (IL) .................................... 131094

(51) Int. Cl.
*G02B 26/00* (2006.01)

(52) U.S. Cl. ...................... 359/291; 359/290; 359/295; 359/298

(58) Field of Classification Search ........ 359/290–292, 359/569, 619, 295, 298, 382, 558, 559, 565, 359/566, 621; 382/210, 211, 213, 162, 199, 382/181, 278, 276, 302
See application file for complete search history.

(56) References Cited

U.S. PATENT DOCUMENTS

| | | | |
|---|---|---|---|
| 3,891,968 A | * | 6/1975 | McMahon ................... 382/124 |
| 3,969,699 A | | 7/1976 | McGlaughlin ............... 382/281 |
| 4,005,385 A | | 1/1977 | Joynson et al. .............. 382/199 |
| 4,460,969 A | | 7/1984 | Chen et al. .................... 95/162 |

(Continued)

OTHER PUBLICATIONS

"Physical Optics in ASAP;" Mar. 2000; ASAP Procedural Note; Breault Research Organization, Inc.—Optical EngineeringSoftware and Services; pp. 1-10.

(Continued)

*Primary Examiner*—Brandi N. Thomas
(74) *Attorney, Agent, or Firm*—Fenster & Company (57) ABSTRACT

The invention relates to determining a matching between discrete optical elements, such as an SLM and a CCD, and continuous optical systems, subsystems and/or elements, such as Fourier lens and individual lenslet of lenslet arrays. Exemplary processing performed by such matched systems includes discrete transforms, such as the discrete Fourier transform, the discrete cosine transform and the discrete wavelet transform.

34 Claims, 2 Drawing Sheets

U.S. PATENT DOCUMENTS

| | | | |
|---|---|---|---|
| 4,590,608 A | 5/1986 | Chen et al. | 382/281 |
| 4,615,619 A | 10/1986 | Fateley | 356/310 |
| 4,847,796 A | 7/1989 | Aleksoff et al. | 708/3 |
| 4,892,370 A | 1/1990 | Lee | 359/29 |
| 4,892,408 A | 1/1990 | Pernick et al. | 356/400 |
| 4,972,498 A | 11/1990 | Leib | 382/211 |
| 5,072,314 A | 12/1991 | Cheng | 359/559 |
| 5,080,464 A | 1/1992 | Toyoda | 359/559 |
| 5,107,351 A | 4/1992 | Leib et al. | 359/11 |
| 5,166,508 A * | 11/1992 | Davis et al. | 250/201.9 |
| 5,216,529 A | 6/1993 | Paek et al. | 359/29 |
| 5,227,886 A | 7/1993 | Efron et al. | 348/62 |
| 5,235,439 A | 8/1993 | Stoll | 359/7 |
| 5,262,979 A | 11/1993 | Chao | 365/49 |
| 5,274,716 A | 12/1993 | Mitsuoka et al. | 382/210 |
| 5,317,651 A * | 5/1994 | Refregier et al. | 382/210 |
| 5,327,286 A | 7/1994 | Sampsell et al. | 359/561 |
| 5,339,305 A | 8/1994 | Curtis et al. | 369/103 |
| 5,454,047 A | 9/1995 | Chang et al. | 382/280 |
| 5,485,312 A * | 1/1996 | Horner et al. | 359/561 |
| 5,537,492 A | 7/1996 | Nakajima et al. | 382/232 |
| 5,659,637 A | 8/1997 | Bagley, Jr. et al. | 382/278 |
| 5,675,670 A | 10/1997 | Koide | 382/281 |
| 5,694,488 A | 12/1997 | Hartmann | 382/210 |
| 5,790,686 A | 8/1998 | Koc et al. | 382/107 |

OTHER PUBLICATIONS

Akitoshi, Y. et al.; "Optical Computing Techniques for Image/Video Compression;" Proceedings of the IEEE; US; New York; vol. 82; No. 6; pp. 948-954; XP000438344.

Eckert, W. et al.; "CompactPlanar-Integrated Optical Correlator for Spatially Incoherent Signals;" Feb. 10, 2000; Applied Optics; vol. 39; No. 5; pp. 759-765.

Zhang, L. et al.; "Incoherent Optical Implementation of 2-D Complex Discrete Fourier Transform and Equivalent4-f System;" Jan. 1, 1990; Optics Communications; vol. 74; No. 5; pp. 295-300; XP000081410.

* cited by examiner

INPUT OUTPUT MATCHING IN OPTICAL PROCESSING

RELATED APPLICATIONS

This application is a U.S. national filing of PCT Application No. PCT/IL00/00282, filed May 19, 2000. This application is also a continuation in part of PCT application No. PCT/IL99/00479, filed Sep. 5, 1999, designating the US, the disclosure of which is incorporated herein by reference.

FIELD OF THE INVENTION

The present invention relates to the field of optical data processing.

BACKGROUND OF THE INVENTION

Many optical processing systems use an SLM (spatial light modulator) to modulate a beam of light, which modulated beam is then processed by various optical elements. The processed light is often detected using a CCD array detector or another type of PDA (planar array detector). Such optical systems utilize discrete optical elements, such as the SLM and detector, even when the nature of processing is continuous, for example using a Fourier lens. This results in a mismatch between the input and output, in some systems. In some cases, also some of the optical processing elements are discrete.

SUMMARY OF THE INVENTION

An aspect of some embodiments of the invention relates to determining a matching between discrete optical elements, such as an SLM and a CCD, and continuous optical systems, subsystems and/or elements, such as Fourier lens and individual lenslets of lenslet arrays. Exemplary processing performed by such matched systems includes discrete transforms, such as the discrete Fourier transform, the discrete cosine transform and the discrete wavelet transform.

In an exemplary embodiment of the invention, the matching is between a continuous signal produced by a processing element (or subsystem) and some kind of non-uniform detector, for example a discrete detector array. Exemplary detectors include CCD detectors and optical fiber array detectors (e.g., for further optical processing). The matching may, for example, take the shape of an optical element between the processing system and the detector, an optical element in the subsystem and/or a selection of data sampling using the detector.

In one embodiment of the invention, the active size of elements in the CCD and the SLM is matched. Alternatively or additionally, one or more binary, continuous or semi-continuous spatially varying neutral density filters are used to match the CCD and/or SLM to the rest of the optical system. Alternatively or additionally, not all the CCD pixels are used to detect the processed light, effectively describing a windowing filter on the CCD. In some embodiments, a spatially varying filter can be emulated by suitable weighting of the driving voltages of the SLM or weighting the received signals on the CCD.

In an exemplary embodiment of the invention, the elements are matched for a general system and not for a dedicated system. Optionally, off-the-shelf elements are used and a matching is determined and implemented, instead of tweaking component parameters or designing custom components. Alternatively or additionally, the matching parameters are changed dynamically, as various optical system parameters change.

The matching may be determined at system construction. Alternatively or additionally, the matching is determined on the fly when the system is reprogrammed or responsive to a particular data set or transform to be implemented by the system.

There is thus provided in accordance with an exemplary embodiment of the invention, a method of designing an optical processing system, comprising:

providing an optical processor comprising at least one discrete element, comprising at least a discrete detector and at least one optical processing element which produces a spatially continuous signal;

determining a matching between said discrete detector and said continuous signal, to provide a desired output on said discrete detector, responsive to a data input; and applying said determined matching in said system. Optionally, determining a matching comprises modeling a behavior of at least one discrete pixel portion of said detector. Alternatively, said detector is an electro-optical detector.

In an exemplary embodiment of the invention, applying said matching comprises selecting a plurality of weight for a plurality of discrete pixel portions of said detector. Optionally, at least 50% of said pixels are ignored. Alternatively or additionally, at least 90% of said pixels are ignored.

In an exemplary embodiment of the invention, applying said matching comprises setting up a matching element. Optionally, said matching element is between said processing element and said detector element. Alternatively, said matching element is between said processing element and an input element, which provides said data.

In an exemplary embodiment of the invention, said element is a flat plate. Alternatively, said matching element is an LCD.

In an exemplary embodiment of the invention, said matching element comprises a mask. Optionally, said mask is a binary mask. Alternatively, said mask is a multi-density mask.

In an exemplary embodiment of the invention, said mask has a plurality of holes defined therein, each hole corresponding to a single discrete pixel of the discrete detector. Optionally, not all the pixels of said discrete detector have a corresponding hole.

In an exemplary embodiment of the invention, an input to said optical processing element comprises an SLM.

In an exemplary embodiment of the invention, an input to said optical processing element comprises a spatially discrete modulated light source.

In an exemplary embodiment of the invention, said optical processing element comprises a lens. Alternatively or additionally, said optical processing element comprises a lenslet array. Alternatively or additionally, said desired output comprises a desired optical transform of said data. Optionally, said transform comprises a Fourier-derived transform. Optionally, said transform comprises a DCT transform. Alternatively, wherein said transform comprises a discrete linear transform.

There is also provided in accordance with an exemplary embodiment of the invention, an optical processing system comprising:

a first, continuous, optical element which generates a continuous spatially modulated beam;

a second, discrete, optical element, which receives said beam; and a matching element, which matches said discrete element to said continuous element to provide a desired optical behavior of the system. Optionally, said matching element comprises a mask. Alternatively, said mask comprises a binary mask.

In an exemplary embodiment of the invention, said mask comprises a plurality of apertures, one per pixel of said discrete optical element, at least for some of the pixels of the optical element.

In an exemplary embodiment of the invention, said matching element comprises a controllable element.

In an exemplary embodiment of the invention, said matching element is between said discrete and said continuous elements. Alternatively or additionally, at least one matching element is between said continuous elements and an input element. Optionally, said input element comprises an SLM (spatial light modulator).

In an exemplary embodiment of the invention, said continuous element comprises a lens. Alternatively, said continuous element comprises a lenslet array.

There is also provided in accordance with an exemplary embodiment of the invention, a method of determining a matching between optical system elements, comprising:

determining a spatial optical distribution field of an input to a processing system;

determining the effect of the processing system on the field;

selecting a desired discrete transform to be applied by the system; and determining a desired matching between a detector of said system and the rest of said system to achieve said desired discrete transform. Optionally, determining a spatial distribution field comprises modeling at least one SLM (spatial light modulator) pixel. Alternatively or additionally, determining a desired matching comprises modeling at least one detector pixel.

BRIEF DESCRIPTION OF THE DRAWINGS

The present invention will now be described in the following detailed description of some embodiments of the invention and from the attached drawings, in which.

DETAILED DESCRIPTION OF SOME EMBODIMENTS

Figure 1:
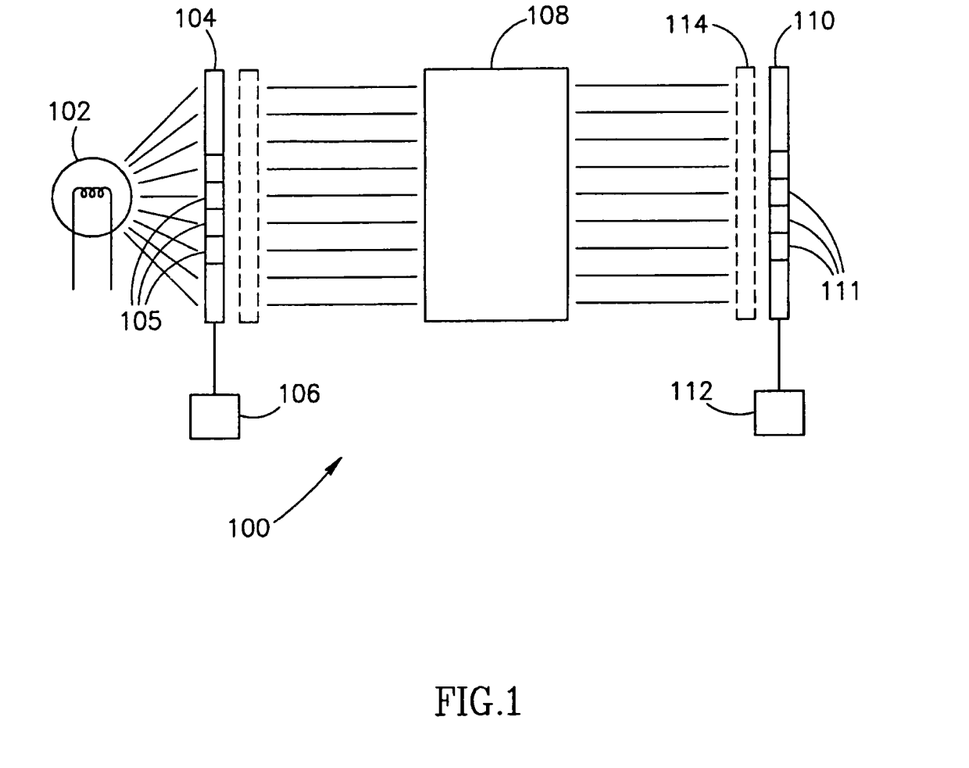
FIG. 1 is a schematic diagram of an optical processing system, in accordance with an exemplary embodiment of the invention.

FIG. 1 is a schematic diagram of an optical processing system 100, in accordance with an exemplary embodiment of the invention. A light source 102 generates a beam of light, which is spatially modulated in a plurality of SLM pixels 105, by an SLM 104. In an exemplary embodiment of the invention, the light is collimated, for example using a lens (not shown). A driver 106 drives the SLM to have a desired spatial modulation effect on the light, for example, corresponding to a set of input data. The modulated beam is then processed by an optical element 108, for example one or more lens or a lenslet array. The processed beam is detected and converted into electrical signals by a detector 110, which typically comprises a plurality of detector pixel elements 111. The electrical signals are then provided to electrical circuitry 112, for example for output to an electrical circuit. System 100 may be varied in many ways within the scope of the invention, for example, the modulated light source may be an array (one or tow dimensional) or light sources, rather than a combination of a light source and an SLM. Various types of optical units may be provided, including, for example masks, holographic lens and/or an SLM. In some embodiments, detector 110 is an optical detector, for further optical processing of the results, rather than electrical processing. System 100 as a whole may be coherent, incoherent or partially coherent.

In one embodiment of the invention, in order to achieve a discrete transform using unit 108, the data is optionally provided as an impulse image, with each image pixel being a spatial delta function, and with optical element 108 comprising, for example, a single or an array of Fourier transform lenses or a 4-f system, which implements a continuous convolution or correlation, which, with matching implemented, can be used to apply a discrete convolution. Spatial delta function-type data provision can be achieved using an SLM with a pinhole filter (e.g., an array of pin-holes), for example a filter 107.

In one embodiment of the invention, for example for DCT transforming, both the SLM and the CCD are spatially matched according to the following formula:

$$\begin{cases} \Delta \bar{x} = 0.5 \cdot \Delta x \\ \Delta u = \dfrac{\lambda f}{2 \Delta x \cdot N} \end{cases} \quad (1)$$

in which $\Delta x$ defines the distances between centers of pixels 105, e.g., the distance between the delta functions (pinholes) in the SLM and $\Delta u$ defines the distances between the centers of pixels 111, e.g., the center-to-center distance between the delta-function receptors in the CCD. Optionally, an ideal (delta function) CCD detector is modeled by providing a pinhole filter in front of the CCD, for example a filter 114, or by creating pinhole detectors on the CCD plane, during its manufacture. In these formulae, f is the focal length of optical element 108, $\lambda$ is the wavelength of the light, N is the number of elements in the discrete sequence of numbers, for example 8 for a 8×8 DCT block transform, and $\Delta \bar{x}$ is the placement of the delta function in the interval between pixel centers (spatial shift) in the SLM, e.g., relative to pixel borders.

Since the pixels intervals in the CCD and the SLM are not necessarily the same, some of the CCD pixels. In multi-wavelength based embodiments, different pinholes may be designated for different wavelengths, for example using active filter elements, such as LCA arrays, that can provide multiple pinhole sizes and/or locations. Alternatively or additionally, circuitry 112 may selectively read signals from different ones of pixels 111, to provide different effective pixel distributions. A high resolution CCD is optionally provided to allow a significant degree of freedom with respect to pixel selection. Alternatively or additionally, a dedicated CCD may be designed, for example including concentric pixels (physically concentric or read as concentric), so that a variable size pixel may be selected electronically. Optionally, different CCD pixels are ignored for different wavelengths, data sets, desired accuracy, expected post-processing and/or transforms. Optionally, a lens or other optical element is used to match the scaling of the system and the detector and/or to allow more efficient use of the desirable (from a matching point of view) CCD detector elements. The percentage of pixels ignored can vary, for example, being greater than 50%, 80%, 90%, 95% or 99%, for example. Alternatively or additionally, the portion of the pixel masked is greater than 50%, 80%, 90%, 95% or 99%, for example. Suitable selection of a matching condition, allows a non-vanishing width to be used for the SLM and/or CCD apertures and still achieve a substantially exact processing.

The above matching condition may be derived using the following analysis (for a one-dimensional case). In one exemplary embodiment of the invention, the modulated light source and system response are mathematically modeled and then, based on the desired transform to be measured, a desired sampling behavior is determined. This sampling behavior may require changes in the system or an additional matching element. In an exemplary embodiment of the invention, depending on the type of matching, one or more of the following may be modeled: the light source distribution, intra-pixel effects on the detector and between pixel effects (e.g., pixel size and dead zone) on the detector.

The following equation defines an exemplary JPEG-DCT, which is to be achieved using optical processing system 100:

$$F(k) = \sum_{n=0}^{N-1=7} f(n) \cdot \cos\left(\frac{\pi k (2n+1)}{2N}\right) \tag{2}$$

Assuming symmetric input, where every block of 16×16 samples (8×8 mirrored twice) is represented as a combination of delta functions, spaced at intervals of size $\Delta x$, and transmitted from a $\Delta \bar{x}$ position inside each interval:

$$s(x) = \tag{3}$$
$$\frac{1}{2}\left(\sum_{n=0}^{N-1=7} f(n) \cdot \delta(x - n \cdot \Delta x - \Delta \bar{x}) + \sum_{n=0}^{N-1=7} f(n) \cdot \delta(x + n \cdot \Delta x + \Delta \bar{x})\right)$$

where s(x) is field distribution function. Applying the optical Fourier transform:

$$\tilde{s}(u) = \int_{-\infty}^{\infty} s(x) \cdot e^{-j\frac{2\pi u x}{\lambda f}} dx \tag{4}$$

The imaginary parts cancel out (due to the input being symmetric):

$$\tilde{s}(u) = \sum_{n=0}^{N-1=7} f(n) \cdot \cos\left(\frac{2\pi u \cdot (n \cdot \Delta x + \Delta \bar{x})}{\lambda f}\right) \tag{5}$$

Assuming accurate sampling at the Fourier plane (the CCD) (or, alternatively, compensating for it using suitable matching):

$$\tilde{s}(k) = \sum_{n=0}^{N-1=7} f(n) \cdot \cos\left(\frac{2\pi \cdot k \cdot \Delta u \cdot (n \cdot \Delta x + \Delta \bar{x})}{\lambda f}\right) \tag{6}$$

Since equation (2) is desired, we match:

$$\tilde{s}(k) = \sum_{n=0}^{N-1=7} f(n) \cdot \cos\left(\frac{2\pi \cdot k \cdot \Delta u \cdot (n \cdot \Delta x + \Delta \bar{x})}{\lambda f}\right) = \tag{7}$$
$$\sum_{n=0}^{N-1=7} f(n) \cdot \cos\left(\frac{\pi k (2n+1)}{2N}\right)$$

One matching condition is:

$$\cos\left(\frac{2\pi \cdot k \cdot \Delta u \cdot (n \cdot \Delta x + \Delta \bar{x})}{\lambda f}\right) = \cos\left(\frac{\pi k (2n+1)}{2N}\right) \tag{8}$$

Leading to:

$$\frac{\Delta u \cdot \Delta x}{\lambda f} = \frac{1}{2N} \tag{9}$$

and $$\frac{2 \cdot \Delta u \cdot \Delta \bar{x}}{\lambda f} = \frac{1}{2N} \tag{10}$$

resulting in the above (Eq. 1) matching condition:

$$\begin{cases} \Delta \bar{x} = 0.5 \cdot \Delta x \\ \Delta u = \frac{\lambda f}{2 \Delta x \cdot N} \end{cases} \tag{11}$$

In some cases, it may be not be convenient, possible or desirable to provide delta functions (pinholes or other optical elements) on one or both of the SLM and CCD. The following analysis shows a method of matching a CCD and an SLM, by spatially modulating the light in a less drastic manner, for example using continuous neutral density filters, for filter elements 107 and 114.

The following equation describes a one-dimensional SLM-like object, e.g., a pixelated source:

$$s(x) = \frac{1}{2}\left(\sum_{n=0}^{N-1=7} f(n) \cdot l(x - n \cdot \Delta x) + \sum_{n=0}^{N-1=7} f(n) \cdot l(x + n \cdot \Delta x)\right) \tag{12}$$

Where l(x) is a general transmission function of each pixel in the SLM, assumed identical for all pixels, and symmetric, so it can be mirrored. However, it should be noted that a similar but more complex analysis can also be performed in the case where not all the pixels are identical, in size, location, intensity or uniformity of transmission, as will be provided below.

After applying the optical (and continuous) Fourier transform:

$$\tilde{s}(u) = \sum_{n=0}^{N-1=7} f(n) \cdot L(u) \cdot \cos\left(\frac{2\pi u \cdot n \cdot \Delta x}{\lambda f}\right) \quad (13)$$

Where $L(u)$ is the Fourier transform of $1(x)$. Since the actual sampling is done by summing all intensities on a detector cell (i.e., a CCD pixel cell), equation (5) transforms to:

$$\tilde{s}(k) = \frac{1}{\Delta \bar{u}} \int_{k \cdot \Delta u - \Delta \bar{u}/2}^{k \cdot \Delta u + \Delta \bar{u}/2} \tilde{s}(u) \cdot W(u - k\Delta u) \cdot du \quad (14)$$

It should be noted that equation (14) is slightly different from that stated for coherent systems, $\tilde{s}(u)$ denotes field distribution rather than intensity. In equation (14), $W(u)$ is the CCD's pixel detection weight function. Again, it is assumed that W is the same for all pixels but this assumption is not essential, except that it simplifies the calculations and is often a relatively correct assumption. Using equation (13):

$$\tilde{s}(k) = \frac{1}{\Delta \bar{u}} \quad (15)$$

$$\int_{k \cdot \Delta u - \Delta \bar{u}/2}^{k \cdot \Delta u + \Delta \bar{u}/2} W(u - k\Delta u) \cdot \left\{ \sum_{n=0}^{N-1=7} f(n) \cdot L(u) \cdot \cos\left(\frac{2\pi \cdot u \cdot n \cdot \Delta x}{\lambda f}\right) \right\} \cdot du$$

In the DCT example, we match:

$$\cos\left(\frac{\pi k(2n+1)}{2N}\right) = \quad (16)$$

$$\frac{1}{\Delta \bar{u}} \int_{k \cdot \Delta u - \Delta \bar{u}/2}^{k \cdot \Delta u + \Delta \bar{u}/2} W(u - k\Delta u) \cdot L(u) \cdot \cos\left(\frac{2\pi \cdot u \cdot n \cdot \Delta x}{\lambda f}\right) \cdot du$$

We define:

$$R_k(u) = \frac{1}{\Delta \bar{u}} L(u) W(u - k\Delta u) \quad (17)$$

The matching requirement is thus:

$$\cos\left(\frac{\pi k(2n+1)}{2N}\right) = \int_{k \cdot \Delta u - \Delta \bar{u}/2}^{k \cdot \Delta u + \Delta \bar{u}/2} R_k(u) \cdot \cos\left(\frac{2\pi \cdot u \cdot n \cdot \Delta x}{\lambda f}\right) \cdot du, \quad (18)$$

$$n, k = 0, 1, \ldots N - 1$$

Which results in the following N×N Fredholm I equations for n,k=0, 1, . . . , N−1 (for the 1D case. In 2D it is N×N×N×N equations)

If one sets $\Delta u$ to be:

$$\Delta u = \frac{\lambda f}{\Delta x} \quad (19)$$

then, one may write $$R_k(u) = \sum_{n=0}^{N-1=7} \cos\left(\frac{\pi k(2n+1)}{2N}\right) \cdot \cos\left(\frac{2\pi \cdot u \cdot n \cdot \Delta x}{\lambda f}\right) \quad (20)$$

It should be noted that Eq. (19) defines a different matching condition than Eq. (11). This condition was obtained in order to simplify Eq. (18) and assure a simple solution of it. This solution defines a matching between individual pixels in the SLM (n) and the CCD (k). $u_k \in [k \cdot \Delta u - \Delta \bar{u}/2, k \cdot \Delta u + \Delta \bar{u}/2)]$. This matching may be applied, for example, by mounting suitable masks on the SLM and/or the CCD, in order to get a proper $R_k(u)$.

It should be noted that equation 20 actually defines a family of solutions, thus, in some embodiments of the invention, standard geometries of SLMs and CCDs are used, while in others one or both of the SLM and CCD are modified to better fit a particular matching solution. In the general case, the matching may be performed by using neutral filters and by matching at least the locations, if not the sizes of CCD and SLM pixels. Sizes of the complete SLM and detector arrays may be matched, for example using a beam expander.

In an exemplary embodiment of the invention, the above matching condition(s) are applied towards other discrete linear transforms which are to be applied using a Fourier lens:

$$F(k) = \sum_{n=0}^{N-1} f(n) \cdot C(k, n) \quad (21)$$

Applying the same procedure as in equations (12)–(20), equation (18) now reads:

$$C(k, n) = \int_{k \cdot \Delta u - \Delta \bar{u}/2}^{k \cdot \Delta u + \Delta \bar{u}/2} R_k(u) \cdot \cos\left(\frac{2\pi \cdot u \cdot n \cdot \Delta x}{\lambda f}\right) \cdot du, \quad (22a)$$

$$n, k = 0, 1, \ldots N - 1$$

So for the general 1D linear transform:

$$R_k(u) = \sum_{n=0}^{N-1} C(k, n) \cdot \cos\left(\frac{2\pi \cdot u \cdot n \cdot \Delta x}{\lambda f}\right), u_k \in [k\Delta u - \Delta \bar{u}/2, k\Delta u + \Delta \bar{u}/2]$$

In the context of matching conditions it should be noted that a matrix arrangement of sub-elements is not required. Rather, it is sufficient that there be a correspondence between the pixels in the SLM and the pixels in the CCD. A simple to manufacture construction is that of a matrix of elements.

The use of the above matching condition may depend on the type of detector used. A standard CCD detector measures power (amplitude squared). Thus, a square root of the measurement may need to be determined. A related issue is that a CCD detector integrates the square of the amplitude, so when even after taking a square root the result is not precise. However, in many cases the effect of the error is negligible and usually smaller than that allowed by the JPEG standard, for compression applications. This error is especially small if most of the CCD area (for each pixel) is ignored, e.g., using a suitable mask. Ignoring most of the CCD area is also useful in that it reduces noise, albeit usually requiring more signal strength.

Alternatively, an amplitude (rather than power) detector is used, for example using a detector with a gamma of 0.5.

Following is a description of an exemplary coherent optical processing system including sign retrieval and the squared Fourier nonlinear channel. A Fourier plane bias term is provided to provide sign retrieval, implemented via a central pixel in each channel (other pixels are mirrored, whereas the bias pixel is centered and unique), as follows:

$$s(x) = \frac{1}{2}\left(\sum_{n=0}^{N-1=7} f(n) \cdot l\left(x - \left(n + \frac{1}{2}\right) \cdot \Delta x\right) + \sum_{n=0}^{N-1=7} f(n) \cdot l\left(x + \left(n + \frac{1}{2}\right) \cdot \Delta x\right)\right) + A \cdot 1(x) \quad (23)$$

$$\tilde{s}(u) = L(u) \cdot \left\{A + \sum_{n=0}^{N-1=7} f(n) \cdot \cos\left(\frac{2\pi \cdot u \cdot \left(n + \frac{1}{2}\right) \cdot \Delta x}{\lambda f}\right)\right\} \quad (24)$$

The actual PDA measurement is:

$$\tilde{s}(k) = \frac{1}{\Delta \bar{u}} \int_{k \cdot \Delta u - \Delta \bar{u}/2}^{k \cdot \Delta u + \Delta \bar{u}/2} |\tilde{s}(u)|^2 \cdot W(u) \cdot du \quad (25)$$

that is, $$\tilde{s}(k) = \frac{1}{\Delta \bar{u}} \int_{k \cdot \Delta u - \Delta \bar{u}/2}^{k \cdot \Delta u + \Delta \bar{u}/2} W(u) \cdot \left|L(u) \cdot \left\{A + \sum_{n=0}^{N-1=7} f(n) \cdot \cos\left(\frac{2\pi \cdot u \cdot \left(n + \frac{1}{2}\right) \cdot \Delta x}{\lambda f}\right)\right\}\right|^2 \cdot du \quad (26)$$

Since all the terms are real, the $|\,|^2$ is a regular square:

$$\tilde{s}(k) = \frac{1}{\Delta \bar{u}} \int_{k \cdot \Delta u - \Delta \bar{u}/2}^{k \cdot \Delta u + \Delta \bar{u}/2} W(u) \cdot |L(u)|^2 \cdot \left\{A + \sum_{n=0}^{N-1=7} f(n) \cdot \cos\left(\frac{2\pi \cdot u \cdot \left(n + \frac{1}{2}\right) \cdot \Delta x}{\lambda f}\right)\right\}^2 du \quad (27)$$

Now, we define a new R:

$$R_2(u) \equiv W(u) \cdot |L(u)|^2 \quad (28)$$

Substituting the equation (28) into equation (27), and opening the quadratic term in the integrand gives:

$$\tilde{s}(k) = \frac{A^2}{\Delta \bar{u}} \cdot \int_{k \cdot \Delta u - \Delta \bar{u}/2}^{k \cdot \Delta u + \Delta \bar{u}/2} R_2(u) \cdot du + \frac{2A}{\Delta \bar{u}} \cdot \quad (29)$$

$$\int_{k \cdot \Delta u - \Delta \bar{u}/2}^{k \cdot \Delta u + \Delta \bar{u}/2} R_2(u) \cdot \sum_{n=0}^{N-1=7} f(n) \cdot \cos\left(\frac{2\pi \cdot u \cdot \left(n + \frac{1}{2}\right) \cdot \Delta x}{\lambda f}\right) \cdot du +$$

$$\frac{1}{\Delta \bar{u}} \cdot \int_{k \cdot \Delta u - \Delta \bar{u}/2}^{k \cdot \Delta u + \Delta \bar{u}/2} R_2(u) \cdot \sum_{n=0}^{N-1=7} \sum_{m=0}^{N-1=7} f(m) \cdot f(n) \cdot$$

$$\cos\left(\frac{2\pi \cdot u \cdot \left(n + \frac{1}{2}\right) \cdot \Delta x}{\lambda f}\right) \cdot \cos\left(\frac{2\pi \cdot u \cdot \left(m + \frac{1}{2}\right) \cdot \Delta x}{\lambda f}\right) \cdot du$$

I.e., $$\tilde{s}(k) = A^2 \cdot I_1(k) + 2A \cdot I_2(k) + I_3(k).$$

To recover the sign, equate (29) with the form $(F(k)+B)^2 = B^2 + 2B \cdot F(k) + F(k)^2 \cdot I_1$ can be seen to be a scaling factor for the $B^2$ constant bias term. $I_2$ is the linear term described above (and solved by a cosine series).

The previously described solution for the linear channel still performs well even as a solution for (29). However, due to (28), $R_2$ is inherently non-negative, contrary to the cosine series. To avoid this issue, a solution of the type $R_2 = R + \phi$, where $\phi$ is a general non-negative bias-like function, can be used in some embodiments of the invention. Equation (29) now reads:

$$\tilde{s}(k) = \quad (30)$$

$$C_R(k) + 2A \sum_{n=0}^{N-1=7} f(n) \cdot \cos\left(\frac{\pi \cdot k \cdot \left(n + \frac{1}{2}\right)}{N}\right) + C_\phi(k) + 2A \sum_{n=0}^{N-1=7} f(n) \cdot$$

$$\frac{1}{\Delta \bar{u}} \cdot \int_{k \cdot \Delta u - \Delta \bar{u}/2}^{k \cdot \Delta u + \Delta \bar{u}/2} \phi(u) \cdot \cos\left(\frac{2\pi \cdot u \cdot \left(n + \frac{1}{2}\right) \cdot \Delta x}{\lambda f}\right) \cdot du +$$

$$\sum_{n=0}^{N-1=7} \sum_{m=0}^{N-1=7} f(m) \cdot f(n) \cdot \frac{1}{\Delta \bar{u}} \cdot \int_{k \cdot \Delta u - \Delta \bar{u}/2}^{k \cdot \Delta u + \Delta \bar{u}/2} \phi(u) \cdot$$

$$\cos\left(\frac{2\pi \cdot u \cdot \left(n + \frac{1}{2}\right) \cdot \Delta x}{\lambda f}\right) \cdot \cos\left(\frac{2\pi \cdot u \cdot \left(m + \frac{1}{2}\right) \cdot \Delta x}{\lambda f}\right) \cdot du,$$

$$C_R(k) \equiv \frac{A^2}{\Delta \bar{u}} \int_{k \cdot \Delta u - \Delta \bar{u}/2}^{k \cdot \Delta u + \Delta \bar{u}/2} R(u) \cdot du, \quad C_\phi(k) \equiv \frac{A^2}{\Delta \bar{u}} \int_{k \cdot \Delta u - \Delta \bar{u}/2}^{k \cdot \Delta u + \Delta \bar{u}/2} \phi(u) \cdot du.$$

Choices of $\phi$ spawn various system architectures: in the most trivial case, $\phi$=const., the $\phi$ terms combine nicely, however, varying 0 can be used in alternative embodiments:

$$\bar{s}(k) = C_{R+\phi}(k) + 2A \sum_{n=0}^{N-1=0} f(n) \cdot \cos\left(\frac{\pi \cdot k \cdot \left(n + \frac{1}{2}\right)}{N}\right) + \qquad (31)$$

$$\frac{2A\phi}{\pi} \sum_{n=0}^{N-1=7} f(n) \cdot \frac{(-1)^{n+k}}{n + \frac{1}{2}} + \phi \sum_{n=0}^{N-1=7} f(n)^2$$

$$C_{R+\phi}(k) \equiv C_\phi(k) + C_R(k).$$

Hence, the DCT can be computed by subtracting the last terms (which can be optionally calculated via electrical logic circuits) from the PDA result.

Figure 2:
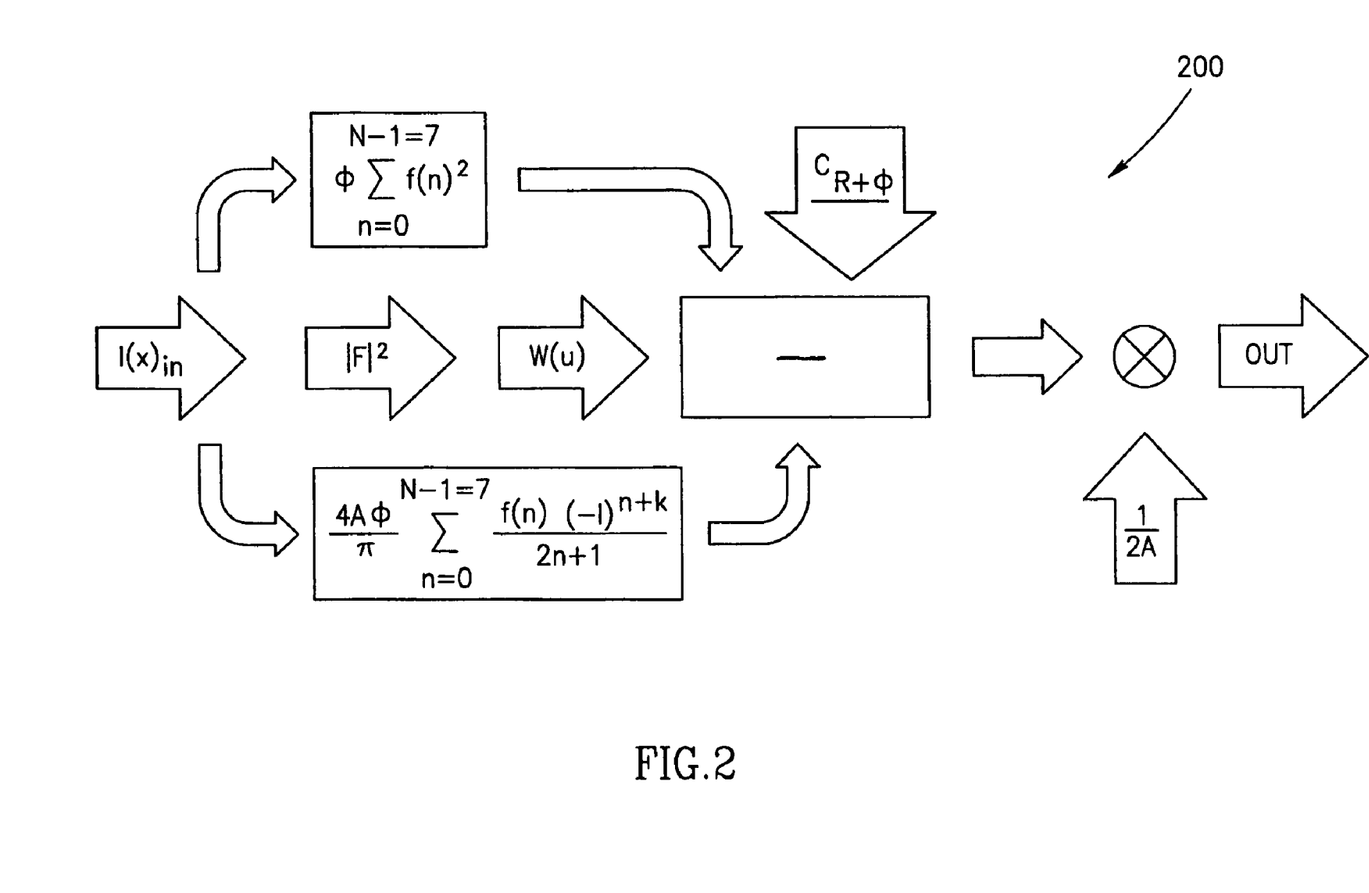
FIG. 2 is a schematic functional flow diagram of a processing in a matched optical system, in accordance with an exemplary embodiment of the invention.

FIG. 2 is a schematic functional flow diagram 200 of a processing in a matched optical system, in accordance with an exemplary embodiment of the invention, for the above example.

Following are the results of a simulation of matching between an SLM and a CCD, under the assumption that the system is an exact continuous Fourier relation with scaling of λf, where λ is the wavelength of the illuminating source and f is the focal length of the Fourier lens.

The goal is to match the SLM and the CCD sufficiently well (e.g., below a desired error threshold), so that the symmetry in the input plane will allow us to obtain a discrete cosine transform (DCT) relation between the values of the SLM pixels and those of the CCD. Had these pixels been modeled as impulses, the desired result would have been obtained. As described above, however, neither the pixels in the SLM nor those in the CCD are usually impulses (very small apertures); rather, they often have a finite size with a limited dead zone.

Assume that the masks to be generated are simple binary masks (one for the SLM and the other for the CCD) consisting of rectangular holes that appear in the middle of each pixel (SLM and CCD). Following is an attempt to determine the expected performances as a function of the width of each rectangular hole. It should be noted, however, that other patterns may be used, including non-binary patterns, such as a Gaussian density and other geometric shapes, such as a plurality of pinholes, circular holes and rectangular holes. The shape of the hole may or may not match the shape of the discrete optical element.

If the widths of each pixel is reduced (i.e., an increase the dead zone) by placing the masks, better results as indicated above may be obtained. However, less light will be detected and low signal-to-noise ratio (SNR) can be expected. Therefore, simulations were carried out to determine the maximum active part of each pixel that should be used, in an exemplary system, in order to obtain an error that is less than 0.1% (9 bit precision). Different results may be expected for different systems, as indicated above.

One hundred random 8-bit series and additional 10 known functions (exponential, sine, cosine, rectangular and linear) were tested. It was found that for a wavelength of 670 nm and pixel size of 20 μm, substantially any active size in the input plane (SLM) could be tolerated but a 90% dead zone in the CCD pixels is desirable. The error (in percent) between the obtained results and the exact DCT is determine to be less than 0.09% in a 90% dead zone embodiment simulated.

The above description has focused on matching for a Fourier system. The following is a presentation of designing a matched optical system for an arbitrary discrete linear transformation of the form:

$$g_k = \sum_{n=0}^{N-1} C_{k,n} F_n \qquad (32)$$

where $$\{f_n\}_{n=0}^{N-1} \text{ and } \{g_k\}_{k=0}^{N-1}$$

are the input and output series respectively.

In order to implement such a transformation optically, let us consider an arbitrary optical system (coherent or incoherent), which is linear in terms of field or intensity distributions, i.e., such a system satisfies the superposition integral:

$$g(x) = \int h(x,\bar{x}) f(\bar{x}) d\bar{x} \qquad (33)$$

where $f(\bar{x})$ is the input continuous signal and $h(x,\bar{x})$ is the response of the system to a shifted impulse function.

Exemplary special cases of the above general equation are the Fresnel, Fourier and fractional Fourier transforms, which can be easily realized by free space propagation and a lens. Another exemplary case is the convolution integral, which is obtained for shift invariant systems, i.e., whenever $h(x,\bar{x}) = h_0(x-\bar{x})$. Convolution can be realized optically with 4-f or imaging systems, both under spatially coherent and incoherent illuminations.

In order to realize a discrete linear transformation using this class of optical systems, consider an input distribution, which is composed of N pixels located at $$-\frac{(N-1)}{2}\Delta\bar{x}, -\frac{(N-3)}{2}\Delta\bar{x}, \ldots, \frac{(N-3)}{2}\Delta\bar{x}, \frac{(N-1)}{2}\Delta\bar{x}: \qquad (34)$$

$$f(\bar{x}) = \sum_{n=0}^{N-1} f_n L_n\left(\bar{x} + \frac{(N-1)}{2}\Delta\bar{x} - n\Delta\bar{x}\right)$$

Each pixel is characterized by a weighting function $L_n(\bar{x})$, which is assumed to be identically zero for any $$|\bar{x}| > \frac{1}{2}\Delta\bar{x}.$$

Further assume that each input pixel consists of N rectangular functions with equal widths and different heights. I.e., defining:

$$rect(x) = \begin{cases} 1 & |x| \le \frac{1}{2} \\ 0 & |x| > \frac{1}{2} \end{cases} \qquad (35)$$

yields that $$L_n(\bar{x}) = \sum_{m=0}^{N-1} w_{m,n} rect\left(\frac{\bar{x} - m\Delta + \frac{N-1}{2}\Delta}{\Delta}\right) \quad (36)$$

where $$\Delta = \frac{\Delta \bar{x}}{N}.$$

Introducing the latter expression in Eq. (33) yields $$g(x) = \quad (37)$$

$$\sum_{n=0}^{N-1} f_n \sum_{m=0}^{N-1} w_{m,n} \int rect\left(\frac{\bar{x} + \frac{N-1}{2}N\Delta - nN\Delta - m\Delta + \frac{N-1}{2}\Delta}{\Delta}\right)$$

$$h(x,\bar{x})d\bar{x}$$

If the output plane is sampled at:

$$-\frac{(N-1)}{2}\Delta \bar{x}, -\frac{(N-3)}{2}\Delta \bar{x}, \ldots, \frac{(N-1)}{2}\Delta \bar{x}$$

then the following is obtained:

$$g_k = \quad (38)$$

$$\sum_{n=0}^{N-1} f_n \sum_{m=0}^{N-1} w_{m,n} \int rect\left(\frac{\bar{x} + \frac{N-1}{2}(N+1)\Delta - }{\Delta}\right) h\left(kN\Delta - \frac{N-1}{2}N\right)$$

$$\Delta, \bar{x}\Big)d\bar{x}$$

where k=0, 1 . . . N–1. Comparing Eq. (38) with Eq. (32) yields:

$$C_{k,n} = \quad (39)$$

$$\sum_{m=0}^{N-1} w_{m,n} \int rect\left(\frac{\bar{x} + \frac{N-1}{2}(N+1)\Delta - }{\Delta}\right) h\left(kN\Delta - \frac{N-1}{2}N\Delta, \bar{x}\right)d\bar{x}$$

Defining a set of N N*N matrices ($R_n$) by:

$$r_n(m, k) = \int rect\left(\frac{\bar{x} + \frac{N-1}{2}(N+1)\Delta - }{\Delta}\right) h\left(kN\Delta - \frac{N-1}{2}N\Delta, \bar{x}\right)d\bar{x} \quad (40)$$

yields that the heights $w_{m,n}$ may be found, for example, by solving a set of N linear equations for each pixel. In other words, in order to find the shape of the $n^{th}$ pixel, the following may be solved:

$$C_{k,n} = \sum_{m=0}^{N-1} w_{m,n} r_n(m, k) \Rightarrow \underline{w}_n = R_n^{-1} \cdot \underline{C}_n \quad (41)$$

It should be appreciated that the above selection of a form for the masking element is arbitrary and is meant to reflect a particular manufacturing capability on hand. Gray-scale, half-tone and binary masks are all contemplated for various embodiments of the invention.

Up to here an arbitrary linear optical system was analyzed. The following is a brief analysis of a shift invariant case, i.e., where $h(x,\bar{x}) \to h(x-\bar{x})$. By defining:

$$s(x) = rect\left(\frac{x}{\Delta}\right) \otimes h(x) \quad (42)$$

we obtain $$r_n(m, k) = s\left((k-n)N\Delta - m\Delta + \frac{N-1}{2}\Delta\right) \quad (43)$$

and Eq. (41) still holds.

This particular embodiment is useful for some applications as it includes several interesting optical systems as special cases (e.g., free space propagation, coherent and incoherent imaging). In any particular solution, it may be desirable to check that $R_n$ is not singular and/or that Eq. (41) has a solution.

In order to test the above described matching method, computer simulations were performed. The goal was to realize the discrete cosine transform (DCT) with the help of a quasi-monochromatic, spatially incoherent imaging system with a rectangular aperture. i.e., in this case:

$$g_k = \sum_{n=0}^{N-1} f_n \cos\left[\frac{\pi}{2N}(2n+1)k\right] \quad (44)$$

$$h(x) = \mathfrak{I}^{-1}\{OTF\} = \text{sinc}^2\left(\frac{xD}{\lambda f}\right) \quad (45)$$

where N=8, D=5 mm (aperture's width), λ=0.5 μm (wavelength) and f=5 cm. The size of each pixel in the input plane was chosen to be 20 µm. The input data was a random i.i.d. sequence, uniformly distributed between zero and one. A suitable (multi-rectangular type) input mask was designed and a system including the input mask was simulated. An absolute error relative to a real DCT of the random input (assuming a high quality input mask could be realized) was found to be less than $10^{-6}$.

The present application is related to the following four PCT applications filed on same date as the instant application in the IL receiving office, by applicant JTC2000 Development (Delaware), Inc.: PCT/IL00/00283 which especially describes various optical processor designs, PCT/IL00/00285 which especially describes reflective and incoherent optical processor designs, PCT/IL00/00284 which especially describes a method of optical sign extraction and representation, and PCT/IL00/00286 which especially describes a method of processing by separating a data set into bit-planes and/or using feedback. The disclosures of all of these applications are incorporated herein by reference.

It should be appreciated that the assumptions on the behavior of the various optical elements described above were solely for simplicity of mathematical description and should not be construed as unnecessarily limiting the application of the invention, in some embodiments thereof. A same mathematical analysis may be performed without the above assumption, to yield solutions for various exemplary systems where the above assumptions do not hold.

It will be appreciated that the above described methods of optical matching may be varied in many ways, including, changing the order of steps, which steps are performed using electrical components and which steps are performed using optical components, the representation of the data and/or the hardware design. In addition, various distributed and/or centralized hardware configurations may be used to implement the above invention. In addition, a multiplicity of various features, both of methods and of devices, have been described. It should be appreciated that different features may be combined in different ways. In particular, not all the features shown above in a particular embodiment are necessary in every similar embodiment of the invention. Further, combinations of the above features are also considered to be within the scope of some embodiments of the invention. In addition, the scope of the invention includes methods of using, constructing, calibrating and/or maintaining the apparatus described herein. When used in the following claims, the terms "comprises", "comprising", "includes", "including" or the like mean "including but not limited to".

The invention claimed is:

1. A method of calculating parameters for a matching mask, comprising:
    providing an optical processor having a given system design and including a continuous optical element performing a continuous optical transform and at least one discrete input or output array component comprising a plurality of discrete elements;
    determining a discrete general linear transform to be performed by said processor after said processor is provided with a matching mask to be determined, said mask being associated with the discrete array component for matching discretization behavior of the component with continuous behavior of said continuous element;
    providing a non-pinhole geometry of a mask element of said matching mask; and
    calculating a plurality of mask elements weights that define a transmittance of said mask element in said geometry, such that said processor at least approximates said general linear transform, by modeling a behavior of the processor including the mask.

2. A method according to claim 1, comprising constructing a mask to have said mask element weights.

3. A method according to claim 1, comprising driving said input or said output array components to apply said mask.

4. A method according to claim 1, wherein said mask element is associated with said input component.

5. A method according to claim 1, wherein said mask element is associated with said output component.

6. A method according to claim 1, wherein said mask element is a multi-density mask element.

7. A method according to claim 1, wherein said mask element is a half-tone mask.

8. A method according to claim 1, wherein said mask element is a binary mask.

9. A method according to claim 1, wherein said mask element is controllable.

10. A method according to claim 1, wherein not all of said discrete elements have a matching transmitting mask element.

11. A method according to claim 1, wherein modeling a behavior comprises modeling a behavior of said input component.

12. A method according to claim 1, wherein modeling a behavior comprises modeling a behavior of said output component.

13. A method according to claim 1, wherein said continuous optical transform is not a continuous version of said discrete general transform.

14. A method according to claim 1, wherein said calculation is dependent on the transform to be performed.

15. A method of determining at least one characteristic of a mask element, comprising:
    (a) providing an optical processor for performing a given discrete general linear transform and having a given system design and including:
        a continuous optical element performing a continuous optical transform;
        at least one discrete input or output array component comprising a plurality of discrete elements; and
        a matching mask associated with the discrete array component for matching discretization behavior of the component with continuous behavior of said continuous element, said mask having a plurality of mask elements;
    (b) determining a desired error behavior of said processor;
    (c) selecting, for each of said mask elements, a value for said at least one characteristic of the mask element;
    (d) simulating the behavior of said processor with said element characteristic value for at least one representative input data set to said processor;
    (e) evaluating an error behavior of said processor from said simulating; and
    (f) repeating (c), (d) and (e) if said error behavior does not meet said desired error behavior.

16. A method according to claim 15, wherein said element has a binary aperture geometry.

17. A method according to claim 15, wherein said element has a non-binary pattern aperture geometry.

18. A method according to claim 15, wherein said element has a rectangular aperture geometry.

19. A method according to claim 15, wherein said error behavior comprises an error rate.

20. A method according to claim 15, wherein said representative input data comprises random data.

21. A method according to claim 15, wherein said representative input data comprises a plurality of known functions.

22. An optical processing system for performing a discrete general linear transform, comprising:
   an input component and an output component, at least one of the components comprising a discrete array comprising a plurality of discrete elements;
   a continuous optical element that performs a continuous optical transform; and
   a matching mask having a masking function defined by a spatially varying transmittance over a plurality of mask elements having a non-pinhole geometry, said mask being associated with said array, for matching discretization behavior of said discrete array with continuous behavior of said continuous element,
   wherein the masking function of said mask optically interacts with said processing system to cause said processing system to at least approximate said discrete general linear transform.

23. A system according to claim 22, wherein said geometry comprises at least three different density levels.

24. A system according to claim 22, wherein said mask is a binary mask.

25. A system according to claim 22, wherein said mask is a grey-scale mask.

26. A system according to claim 22, wherein said mask is a half-tone mask.

27. A system according to claim 22, wherein said mask is a continuous varying density mask.

28. A system according to claim 22, wherein said masking function defines a rectangular aperture.

29. A system according to claim 22, wherein said masking function defines a plurality of apertures for a single mask element.

30. A system according to claim 22, wherein said mask is controllable.

31. A system according to claim 22, wherein said continuous element comprises a lens.

32. A system according to claim 22, wherein said continuous element comprises a lenslet array.

33. A method according to claim 15, wherein said at least one characteristic comprises a geometry.

34. A method according to claim 15, wherein said at least one characteristic comprises a size.

* * * * *